United States Patent
Dean et al.

(10) Patent No.: US 12,527,666 B2
(45) Date of Patent: Jan. 20, 2026

(54) SYSTEMS AND METHODS FOR POINT-OF-NEED MANUFACTURING

(71) Applicant: Ohio State Innovation Foundation, Columbus, OH (US)

(72) Inventors: David Dean, Columbus, OH (US); Glenn Daehn, Columbus, OH (US); Michael Groeber, Columbus, OH (US); Stephen Niezgoda, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 394 days.

(21) Appl. No.: 18/020,152

(22) PCT Filed: Aug. 9, 2021

(86) PCT No.: PCT/US2021/045253
§ 371 (c)(1),
(2) Date: Feb. 7, 2023

(87) PCT Pub. No.: WO2022/032235
PCT Pub. Date: Feb. 10, 2022

(65) Prior Publication Data
US 2023/0301791 A1    Sep. 28, 2023

Related U.S. Application Data

(60) Provisional application No. 63/063,190, filed on Aug. 7, 2020.

(51) Int. Cl.
*A61F 2/00*    (2006.01)
*A61F 2/30*    (2006.01)
(Continued)

(52) U.S. Cl.
CPC .......... *A61F 2/30942* (2013.01); *B33Y 80/00* (2014.12); *A61B 2034/102* (2016.02);
(Continued)

(58) Field of Classification Search
CPC ........ A61B 2034/102; A61B 2034/105; A61B 2034/108; A61B 34/10; A61F 2/2803;
(Continued)

(56) References Cited

U.S. PATENT DOCUMENTS

| 4,658,808 A | 4/1987 | Link |
| 2005/0133955 A1* | 6/2005 | Christensen ....... G05B 19/4097 264/401 |

(Continued)

FOREIGN PATENT DOCUMENTS

WO    2019162636 A1    8/2019

OTHER PUBLICATIONS

Extended European Search Report, dated Jul. 22, 2024, received in connection with corresponding EP Application No. 21852142.5.
(Continued)

*Primary Examiner* — Julio C. Gonzalez
(74) *Attorney, Agent, or Firm* — Meunier Carlin & Curfman LLC

(57) ABSTRACT

Systems and methods are disclosed to manufacture a custom repair or replacement part at the location in which the repair/replacement will be performed. Scans are performed to determine a wear pattern and topology of the location where the replacement part is to be placed and manufacturing instructions are generated to manufacture the repair part using localized manufacturing techniques according to customized parameters to meet functional requirements of the repair/replacement.

30 Claims, 6 Drawing Sheets

(51) Int. Cl.
*B33Y 80/00* (2015.01)
*A61B 34/10* (2016.01)

(52) U.S. Cl.
CPC ... *A61B 2034/105* (2016.02); *A61B 2034/108* (2016.02); *A61F 2002/30985* (2013.01)

(58) Field of Classification Search
CPC .......... A61F 2/2875; A61F 2002/30011; A61F 2002/30092; A61F 2002/30736; A61F 2002/3092; A61F 2002/30957; A61F 2/30942; A61F 2002/30985; A61F 2002/30952
USPC .......................................................... 700/98
See application file for complete search history.

(56) References Cited

U.S. PATENT DOCUMENTS

| | | |
|---|---|---|
| 2006/0275736 A1 | 12/2006 | Wen et al. |
| 2010/0324692 A1* | 12/2010 | Uthgenannt ....... A61B 17/1764 606/86 R |
| 2011/0305379 A1 | 12/2011 | Mahfouz |
| 2012/0209394 A1 | 8/2012 | Bojarski et al. |
| 2013/0211531 A1* | 8/2013 | Steines ................ A61F 2/3859 623/20.14 |
| 2014/0067107 A1 | 3/2014 | Stanhope et al. |
| 2015/0370958 A1 | 12/2015 | Arisoy et al. |
| 2017/0014169 A1* | 1/2017 | Dean .................. A61B 17/8071 |
| 2018/0349519 A1 | 12/2018 | Schroeder |
| 2018/0353308 A1 | 12/2018 | Tompkins |
| 2019/0060079 A1* | 2/2019 | Unis .................. G05B 19/4099 |
| 2020/0000596 A1* | 1/2020 | Prevrhal ................ G16H 50/50 |
| 2021/0053291 A1 | 2/2021 | Bouvier et al. |

OTHER PUBLICATIONS

International Search Report and Written Opinion, dated Nov. 17, 2021, received in connection with International Patent Application No. PCT/US2021/045253.

Daehn, "A Vision of Numerically Controlled Autonomous Manufacturing and Metal Forming," Department of Materials Science and Engineering, Ohio State University, 2021, 11 pages.

Daehn, G. S., "Metamorphic manufacturing: The third wave in digital manufacturing," Manufacturing Letters, vol. 15, 2018, pp. 86-88.

Dean D, Min K-J, Bond A: Computer aided design of large-format prefabricated cranial plates. J. Craniofacial Surgery, 14:819-832, 2003.

Subramanyan, K., & Dean, D. (2000). A procedure to average 3D anatomical structures. Medical Image Analysis, 4(4), 317-334. doi:10.1016/s1361-8415(00)00031-.

International Preliminary Report on Patentability in Application No. PCT/US2021/045253, dated Feb. 16, 2023.

* cited by examiner

NORMAL ADULT MANDIBLE WITH FINITE ELEMENT MODEL BOUNDARY CONDITIONS (LEFT). Ti-6Al-4V FIXATION (ABOVE) HARDWARE AND POROUS NiTi IMMOBILIZATION (BELOW, RIGHT). POROUS NiTi DEVICE'S STRESS DISTRIBUTION ALLOWS THE DESIRED DISTRIBUTION, WHILE MAINTAINING SUFFICIENT IMMOBILIZATION DURING THE POST-SURGICAL HEALING PERIOD.

DEMONSTRATION OF EFFECTIVE PROPERTY OPTIMIZATION. (LEFT) BEAM GEOMETRY AND LOADING CONDITION. (RIGHT) RESULTING ELASTIC STIFFNESS FIELD COLORED AS A FRACTION OF THE YOUNGS'S MODULUS OF THE FULLY DENSE MATERIAL. TARGET EFFECTIVE STIFFNESS OF THE BEAM WAS SET TO 70% OF THE A DENSE BEAM.

Figure 7: Example of plastic pelvis model from the Sawbones company. The models can be purchased with typical fractures and used for surgical planning or implant design and testing.

derlying by digital workflows that can be certified to produce function that restores damaged components or those at the end of their use-life.

SYSTEMS AND METHODS FOR POINT-OF-NEED MANUFACTURING

CROSS REFERENCE TO RELATED APPLICATIONS

This application is a U.S. National Stage application filed under 35 U.S.C. § 371 of PCT/US2021/045253 filed Aug. 9, 2021, which claims the benefit of priority to U.S. Provisional Application No. 63/063,190 filed Aug. 7, 2020, each of which is hereby incorporated herein by reference in its entirety

BACKGROUND

Field

Embodiments of the present invention relate to custom manufacturing of custom parts on location, specifically a systems and methods of manufacturing implant devices tailored to particular patient needs at an operating location.

Background

In most engineered systems, including aerospace systems, components can be designed to be replaced with effective duplicates as long as sufficiently similar materials and manufacturing processes are used to produce a replacement component. However, as components age, if their mechanical properties and/or geometries change, they may wear or be damaged in a unique pattern not suited to a generic replacement part. When new restorative maintenance is performed, an original off-the-shelf component may not be an ideal replacement to maintain the current function of the system. Further, the supply chain is often challenged when trying to obtain small numbers of highly specialized components, especially those designed to have longest possible (or at least predictable due to materials-aware fabrication process and part function engineering) use-life, due to loss of original manufacturing sources, long lead nines, or poor economics for 'one-off' items. These and other realizations have led some operations/operators to invest heavily in capturing usage and maintenance data to build 'digital twins' of their systems for improved functional monitoring and planning. The types of information they now, or soon will, archive, are akin to an electronic health record. Indeed, system-customized inspection and maintenance procedures align with the vision of personalized medicine.

Replacement part fabrication and functional maintenance challenges associated with engineered systems are less complex than they are in biological systems, where an original manufacturing source is effectively non-existent. However, it is similar that functional models and measures of performance of components are key to restoring function, with minimal decrement and downtime, to the entire system. Another similarity between the aerospace industry, specifically in flight-critical systems, and the medical industry, when dealing with implanted devices for example, are the qualification and certification procedures needed to ensure and monitor safe function. In both cases, production and deployment of replacement components involves onerous testing and trials (i.e., validation and verification) to develop confidence in procedures to produce functionality. In medicine these activities are documented and regulated as "quality systems.

The current state of both of these domains highlights a critical need for flexible manufacturing processes that are driven by digital workflows that can be certified to produce function that restores damaged components or those at the end of their use-life.

BRIEF SUMMARY OF THE DISCLOSURE

Accordingly, the present invention is directed to systems and methods for point-of-care manufacturing that obviates one or more of the problems due to limitations and disadvantages of the related art.

In accordance with the purpose(s) of this invention, as embodied and broadly described herein, this invention, in one aspect, relates to a method of manufacturing a custom part, including, for example, scanning a location for said custom part to generate a map of the location including custom topology of the location; matching the custom topology to a template for a type of part to be customized to generate a digital model of said custom part; generating manufacturing processing instructions according to the template and the custom topology for a localized manufacturing device; providing the manufacturing processing instructions to the localized manufacturing device; manufacturing the custom part using the localized manufacturing device.

In another aspect, the invention relates to a system for manufacturing a custom part including a scanning device for scanning a location for said custom part to generate a map of the location including custom topology of the location; a localized manufacturing device, and a computer processor running thereon software capable of executing instructions to generate manufacturing processing instructions according to the template and the custom topology for a localized manufacturing device; and provide the manufacturing processing instructions to the localized manufacturing device for manufacturing the custom part according to the manufacturing process instructions.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

Further embodiments, features, and advantages of the systems and methods for point-of-care manufacturing, as well as the structure and operation of the various embodiments of the systems and methods for point-of-care manufacturing, are described in detail below with reference to the accompanying drawings.

It is to be understood that both the foregoing general description and the following detailed description are exemplary and explanatory only, and are not restrictive of the invention as claimed.

BRIEF DESCRIPTION OF THE DRAWINGS

The accompanying figures, which are incorporated herein and form part of the specification, illustrate systems and methods for point-of-care manufacturing. Together with the description, the figures further serve to explain the principles of the systems and methods for point-of-care manufacturing described herein and thereby enable a person skilled in the pertinent art to make and use the systems and methods for point-of-care manufacturing.

DETAILED DESCRIPTION

Figure 1:
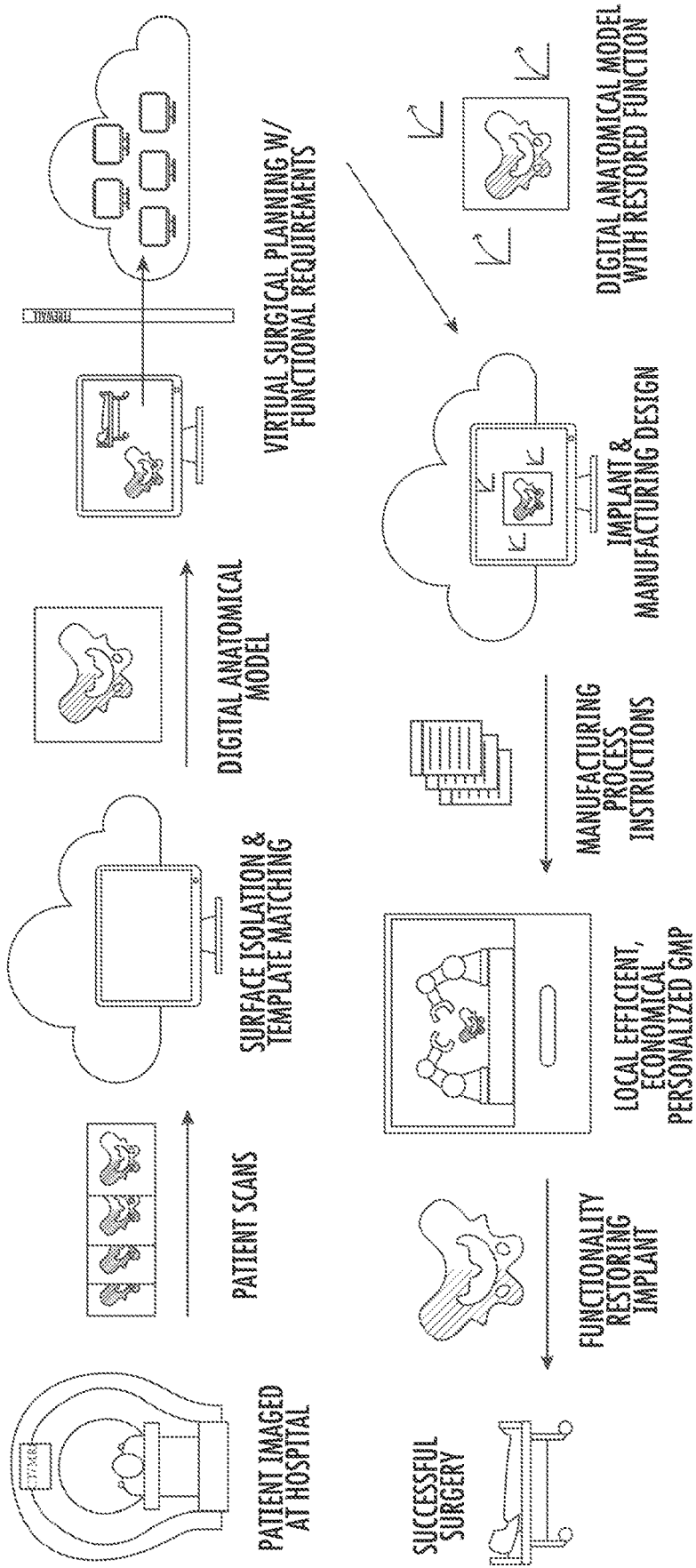
FIG. 1 shows an exemplary workflow for point-of-care manufacturing according to principles described herein.

Reference will now be made in detail to embodiments of the systems and methods for point-of-care manufacturing with reference to the accompanying figures. The same reference numbers in different drawings may identify the same or similar elements.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Throughout this application, various publications may have been referenced. The disclosures of these publications in their entireties are hereby incorporated by reference into this application in order to more fully describe the state of the art to which this invention pertains.

Current commercially available medical implant design software generally does not attempt to capture the local, intra- and inter-patient geometric heterogeneity and its relation to biomechanical requirements. The focus of this present disclosure is a simulation environment and associated data scheme to determine the spatially resolved biomechanical requirements of patient-specific implants and embed those requirements in the digital model. Local processing manipulations during manufacturing can be used to tailor mechanical performance spatially (e.g., local stiffness matching, especially at device-host attachment sites). Microstructural requirements can be addressed to produce spatially heterogeneous mechanical performance, perhaps making use of a biomechanically-informed simulation. In some aspects of the present disclosure, more than topology is captured, in the sense of macroscopic geometry of the patient. In additions, systems and methods described herein allow for tailoring the properties of the device to be more representative of the biological system. For example, device design can be tailored according to principles described herein to be personalized design due to disease process, function needed by particular patient, defect site specificity including incorporation, shape, and function, into defect site, and restorative needs—i.e., to restore or bring about anew, e.g., congenital defect, function.

In an exemplary embodiment, a template-based implant design process may encompass a validated patient-specific implant design toolkit to a POCM workpath. The ultimate system may be tailored to be implant-type specific, but the overall system concept can be used for any type of patient implant (or in a larger context, repair or replacement of operational parts, e.g., in the aerospace industry). In the patient care context, for example, cranial implants, replacement joints, fracture repair, etc. are examples of application of the principles described herein.

This may not always have a precursor, but wherever possible a template of normative shape and function is desirable. In medicine, currently, templates with both shape and function norms are exceptionally rare, but should be the goal.

According to principles described herein, methods could include simulation of patient-specific, post-operative function at the start of the design process. A surgical planning environment facilitates the Computer Aided Design (CAD) and manufacture of surgical guides and implants that include not only appropriate geometry, but also appropriate mechanical performance, to restore patient-specific function. The primary technology gap now is that, although there are image-based systems that recreate normal shape, there are no commercially available surgical planning software environments for use at the point-of-care that allow comparison of normal form and function to that of the post-operative patient during the design of a patient-specific medical device. In the hip implant example, instead of restoring normal loading patterns that facilitate the range of motion and power that the patient once had, they are left with a system which usually depends on press fitting of overly stiff components that rely on textured surfaces to prevent slippage. The high (i.e., 4-6 times higher) stiffness of these devices efficiently bypass previously loaded segments of the skeleton, which may undergo stress shielding, leading to loss of remodeling required to tip the balance of bone metabolism from bone maintenance to bone resorption. Additionally, the lack of mechanical modeling at the point-of-care insures highly-stiff attachment sites, either mesh (older individuals) or screws, will be candidates for stress concentration, especially at the sharp threads of screws.

According to principles described herein, performance outcomes associated with system maintenance/repair will be drastically improved by accounting for replacement component geometry and function in design software that creates a virtual planning environment. Gains in efficiency in both time and cost will be the rule rather than the exception when performing the design and manufacturing of the replacement components at the point-of-care.

In another example, design of novel pelvic ring fixation devices are not possible to design in current commercial point-of-care software. Traumatically-induced pelvic ring instability is often life-threatening. It is of critical importance for patient survival and thus the timeline associated with repair/restoration is tight and prohibitive to currently available centralized manufacturing of patient-specific fixation devices.

Accordingly, the present systems and methods may use one or many multiple medical imaging modalities (e.g., ultrasound, CT, MRI) that sample structure and function as inputs to the computer assisted design process. For example, available medical scans may be accessed by obtaining de-identified anatomical images from known sources to build anatomical templates for simulating a patient's structural and functional anatomy. Additionally, the data can then be analyzed to segment and automatically detect landmarks for surface mapping and model building for a specific type of implant, medical prothesis or other patient specific device. In a non-medical setting, data can be gathered similarly to evaluate wear and/or damage patterns for designing replacement parts.

The specifics of a planning environment will be inherently tied to the specific application/component of interest and the recipient geometry. For example, the simulation of component performance in a military aerospace application will require knowledge of mission profiles to determine relevant loading regimes and performance requirements. Analogously, in a medical implant application, component performance will be driven by biomechanics and patient anatomy. Each step in the digital/cyber planning workflow will have different, but analogous, data and/or tools depending on the application.

As a specific example, FIG. 1 shows an exemplary workflow for point-of-care manufacturing of pelvic ring fixation devices (and is applicable to other patient specific devices). The workflow begins with capturing the patient's current anatomical state by means of medical imaging. Often the current anatomical state is damaged enough that simply using the patient's scan data to build a post-operative simulation model without including significant surgical intervention is not feasible. In these cases, the patient's data can be segmented to isolate surfaces of interest and those surfaces can be matched to, and mapped by, an anatomical template.

Geometry-based anatomical templates can be designed by averaging sets of scans of 'normal' or 'nominal' anatomy to include functional information (e.g., loading regimes). Congenital defect requires attempt to bring about "normal" function (e.g., move, see, eat, breath, speak, hear, etc.). This also applies to anatomy devastated by cardiovascular disease or cancer.

The utility of the anatomical templates comes in the next step in the workflow when the template can be used in virtual planning of treatment. Such virtual planning may be performed in an open-loop, intuition-driven manner, where physicians and other experts judge options without feedback on the impacts on system function. In the exemplary workflow shown in FIG. 1, the virtual planning step integrates biomechanical performance simulations that provide closed-loop feedback to illustrate impacts on system function based on potential material choices, design criteria, fabrication process engineering, and deployment decisions.

In this workflow, a new concept is created—a geometric-mechanical template that captures both desired geometry and spatially-resolved post-operative performance. The next step in the envisioned POCM workflow is the design of implant and manufacturing process. This step requires simulation and decision-making tools to account for initial material properties and their evolution during manufacturing to ensure geometric and performance criteria can be met. Finally, the physical manufacturing of the implant is performed in local manufacturing facilities that are efficient and economical, while adhering to good manufacturing. There could be analogous workflows for other applications and the specific forms of data and simulation tools would change slightly, but the general workflow is common to many applications and can be adapted accordingly.

Figure 2:
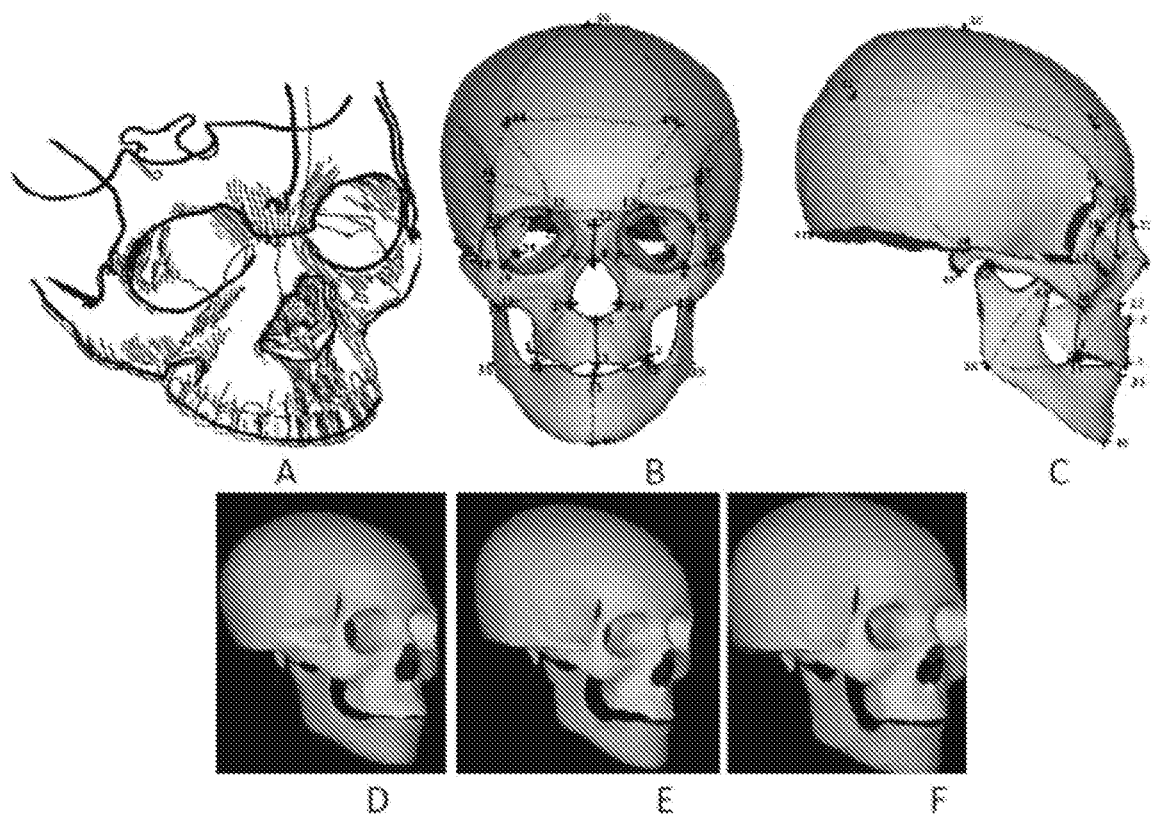
FIG. 2 shows an example of deformable template anatomical mapping.

FIG. 2 shows an example of deformable template anatomical mapping. Subpart A shows crest lines referred to as "ridge curves" help map skill and mandible templates. Subpart B is a frontal view and subpart C is a lateral view of average skull shape showing superimposed template. Subparts D, E, and F illustrate African American, Caucasian, and Asian skull shapes that have been used to create patient-specific surgical guides and implants in a clinical setting using implant CAD software. In an example Geometric morphometric tools (e.g., shape statistics) and approaches using "ridge curve" based anatomical templates (FIG. 2) for skull and mandible templates. They were initially used for planning reconstructive surgeries. That work uncovered the importance of shape variation due to differences in ethnicity and sex. The production of average skull shapes uses the same or similar matching algorithms that can be used facilitate the fitting of a new "normal" pelvis template to any patient's image for surgical reconstruction, as well as the design of an implant that will fixate a pelvic ring fracture or multiple fractures. Traditional CAD approaches that use ideal shapes (e.g., cubes, cylinders, pie wedges) are ill-suited for designing patient specific implants that will be ready prior to the surgical repair of a defect site.

Figure 3:
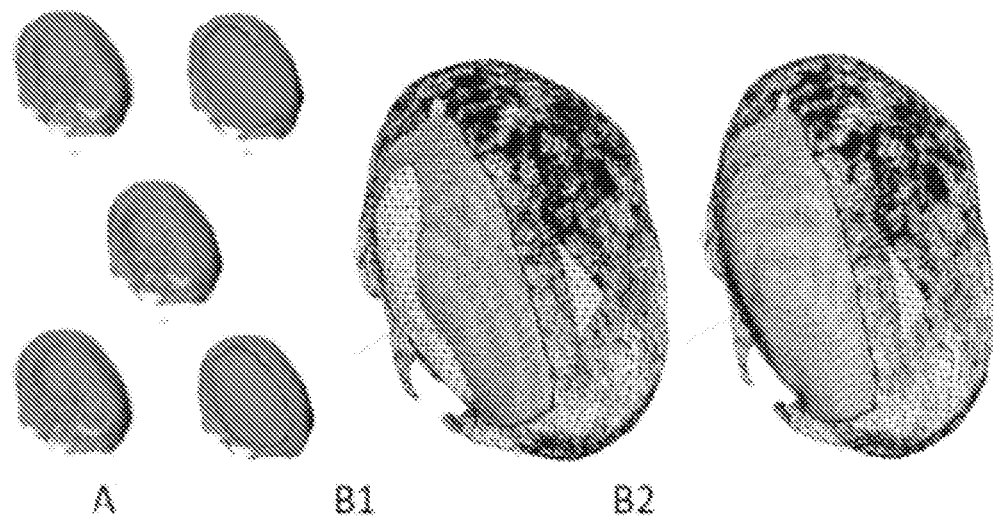
FIG. 3 shows template-based cranial implant design for the purposes of explanation of the principles described herein.

In preparation of patient specific pelvic fixation implants, a pre-operative image, usually a 3D CT image, can be used to identify the shape of the pelvis. A template may be used to map the surface. Repairs to the pelvis (i.e., reposition fragments) may be made by comparing the mapped image to a "normal" image, similar to what is seen in FIG. 3, where a skull defect is repaired. FIG. 3 shows template-based cranial implant design. Subpart A shows a template matched to edge of a defect, via a 2-pass warp. Subpart B shows correction of an implant intersecting surrounding tissues. B1 intersects the scalp and B2 shows the scalp intersections corrected. Any implants that are designed in that virtual surgical scene should not intersect or apply pressure to other surrounding tissues. In the example shown in FIG. 3, those adjacent tissues are the brain and scalp.

Demonstrating the transferability of the approach from the skull, we have designed mandibular implants in two subsequent studies, where we used a "normal" mandible template to generate the correct shape for the repair of mandibular segmental defects—even when the patient's own data are not appropriate (e.g., because of prior surgery, prior pathology, or congenital deformity). Once isolated from the template, the shapes of grafted bone and the surrounding anatomy are the starting point for the identification of a proper set of material properties for an optimal, regenerative fixation strategy. We have developed a methodology to systematically create a Finite Element Model (FEM) of mastication from a patient's 3D CT-scan that is used to determine the mechanical properties needed in patient-specific fixation hardware.

This same approach can be applied to pelvic ring fracture fixation. In order to obtain the necessary anatomical images without entering a clinical setting, de-identified data from a collective database may be used, e.g., through Ohio State University's Honest Broker system. For that purpose, the Center for Clinical and Translational Science acts (CCTS) at OSU acts as a concierge to the Department of Radiology to provide de-identified data for scientific studies. A request for data is made through CCTS and transferred to the Department of Radiology, where a Radiologist with access to the Ohio State University Wexner Medical Center's HIPAA-protected image database collects relevant scans and delivers them in an anonymized form. In the example of pelvic ring fracture fixation, a request to obtain pelvis data may be requested by a request such as, "We would like to obtain de-identified (per the Honest Broker protocol) 3D CT images that isolate and present (preferably healthy/normal) a whole, adult fibula, femur and pelvis. We would like to obtain separate studies/images for each of the three bones structures mentioned. Per the Honest Broker protocol, we would like to obtain 100 image studies (cases) for normal pelvis 3D CT studies. For the 3D CT studies, we would like to know pixel size and slice thickness. Preferably, the slice thickness will be approximately 1-3 mm. For the individual (s) depicted in the 3D CT images, we would like to know age, gender, ethnicity, health status of the patient, and body size (BMI or weight). Preferably, the individual(s) age would be between 21 and 55 years old." The radiologist will locate scans meeting the criteria, de-identify them (i.e., take out all personally identifying information) and save them to a common access point. Similar resources can be used for other applications and other components, including for other bio-mechanical/anatomical systems, fixtures, implants and protheses. In an alternative, databases containing the subject physical data can be built.

The biomechanical loads that imparted during normal physical activity allow for determining the performance requirements of the medical implant. In previous work on mandibular implants, for example, the material properties and the force created by the chewing muscles used in our FEM of mastication were based on published information. That same type of information is available for other anatomical systems, such as the lower back (i.e., lumbosacral region) and hip skeleton and musculature. Moreover, modeled back and hip muscle function can be validated by loading studies with electromyographic verification of muscle use (EMG). The resulting patient-specific Finite Element Analysis (FEA) may be used to determine the fixation device material property gradient requirements that will best serve the reconstructed pelvis.

Figure 4:
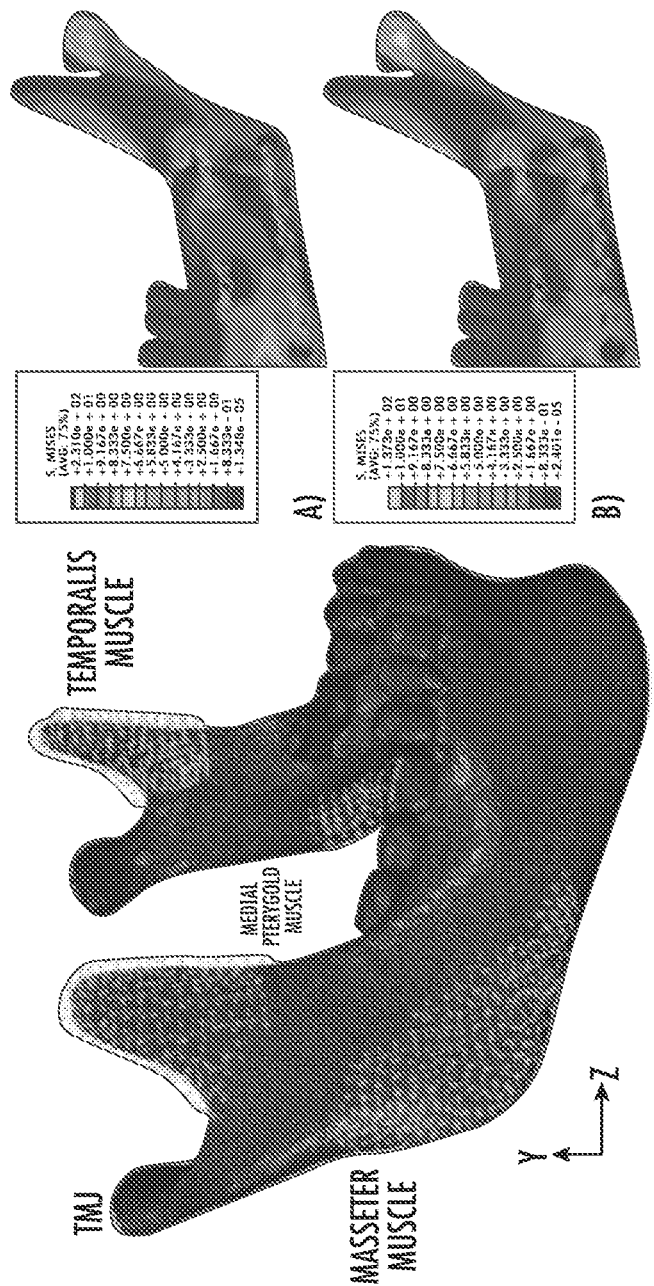
FIG. 4 shows a normal adult mandible with finite element modal boundary conditions for the purposes of explanation of the principles described herein.

Simulations validating material properties in an FEA to identify the required material properties of mandibular fixation devices showed that the resulting fixation device avoids unnecessary stress concentrations and delivers a stress-strain distribution through the grafted bone and host bone that is as close to normal as possible. FIG. 4 shows the forces applied to the mandible and the resulting stress distribution in fixation hardware with two different materials (analogous to our approach to pelvic ring fixation). The current standard-of-care maxillofacial procedure involves imaging the bone available for grafting and bringing that shape, virtually, into the defect site in order to later guide the surgeon's placement of the graft in the operating room as well as to design a fixation device. A POCM workpath according to principles described herein provides a single environment where device design couples material properties with implant geometry to inform its manufacturing process and deployment in the OR.

FIG. 4 shows a normal adult mandible with finite element modal boundary conditions. Ti-6Al fixation hardware and porous NiTi immobilization are also shown. In this example, the porous NiTi device's stress distribution allows the desire distribution, while maintaining sufficient immobilization during the post-surgical healing period. FIG. 4 highlights a surgical planning and implant design environment that allows one to design an optimal implant by choosing materials that deliver both short term bone immobilization and long term biomimetic (normal) stress-strain distribution. This distribution allows for creation of a desired shape from grafted bone and for long life of the fixation device and the healed bone. Grafted bone may not have the same distribution of cortical bone as in the original mandibular segment. That could cause a shift in the loading pattern.

According to principles described herein, with the proper design and interactive use simulation, the shape and/or the material for the fixation can be determined.

In the pelvic ring fracture fixation example, reestablishing a normal loading pattern will drive fixated pelvic fragments to heal and remodel so that the whole structure becomes strong and can accept increased muscle power and physical exertion over the long term. During the healing period, low load walking could occur. Because the whole pelvis is under load, and all of the muscles will be used, without damage, healing and strengthening should be accelerated. Similarly, THA patients are ambulatory very soon after receiving their implant for the same reasons.

As shown in FIG. 4, patient tissue geometry and material property modeling, key parts of the fixation design process, are used for identifying the forces that act on the repaired bone. A 3D CT image of the patient can be used to create a CAD file for use in an FEA with accurate depiction of the shape and size of the pelvis and the surrounding muscles. Walking is a complex dynamic process involving synchronous movements of at least the lower spine, pelvis, and legs in a rhythmic fashion. To accurately model the mechanics of walking, heal strike, and toe-off of each foot, the overall model should be loaded at normal levels. Models of the vectors, forces, and strain pattern undergone by the healthy person's axial skeleton and muscles during walking can be modeled. The muscle forces that are generated can be determined from a patient's 3D CT scan. Exact muscle forces are estimated based on each muscle's maximum cross-sectional area as seen in the patient's 3D CT. We determine fixed boundary conditions and the loads applied during walking for a particular patient. We use this FEA of the mechanics of a person's ambulatory skeleton to model the desired normal function of healed, fixated pelvic bone that supports walking.

According to principles described herein, it is possible to design local microstructure and manufacturing processes for function restoring implants, e.g., point of care manufacturing in conjunction with on site design. For example, fabrication methods for creating stiffness-matched fixation devices by using less stiff, biocompatible materials may be possible. For example, a leading candidate to replace Ti-6Al-4V is nitinol (nickel titanium or NiTi), especially in a porous form. In our investigation on mandibular fixation devices for reconstructive surgery, we investigated replacing Ti64 hardware with Nitinol hardware. Surface porosity was added to monolithic (i.e., non-porous, solid) medical implants in order to improve anchorage to the bone. These surface features result in minor, if not immeasurable, reduction of stiffness. In contrast, an implant with selectively distributed internal porosity can have significantly reduced stiffness. Selective pore distribution is especially important in inert (i.e., non-resorbing) implants as the stiffness of porous materials can be altered and optimized by controlling pore size, distribution, and shape.

The rapid transition of Young's modulus (stiffness) from patient tissue to Ti-6Al-4V fixation and/or joint replacement devices increases the likelihood of device failure. Overall, 36-39% of mandibular fixation devices can be expected to fail and require revision surgery, with 8-10% of fixation plates having been observed to break, loosen, or in other ways fail during normal activities. Total Hip Arthroplasty revision within five years has been reported as high as 24.1% by experienced practitioners. Highly stiff standard of care fixation devices, or bone and joint replacement implants, may shield parts of the surrounding bone that were previously load-bearing. Instead, they carry stress to new and often over-localized sites (e.g., fixation screws). The mismatched stiffness can cause high shear stress at the bone/implant interface (i.e., "stress concentrations") and reduced displacement (i.e., "stress shielding") in the surrounding bone. The bone may not be able to accommodate the newly revised stress-strain trajectory, resulting in 1) potential fracture or 2) stress shielding causing bone resorption in newly unloaded regions possibly leading to a reduction of bone density (osteopenia) around an implant. These resorptive processes can cause the loss of bone around fixation plates, which could result in loosening. This problem is commonly observed in mandible, hip, knee, spine, and shoulder grafts, implants, and trauma related bone fixation. Most bone fixation and joint replacement hardware today are made primarily of Ti-6Al-4V. Less stiff material, such as NiTi, may be less likely to fail or loosen. The amount of bone loss due to mismatched instrumentation material properties can be quantified through the use of strain adaptive bone remodeling theory.

Figure 5:
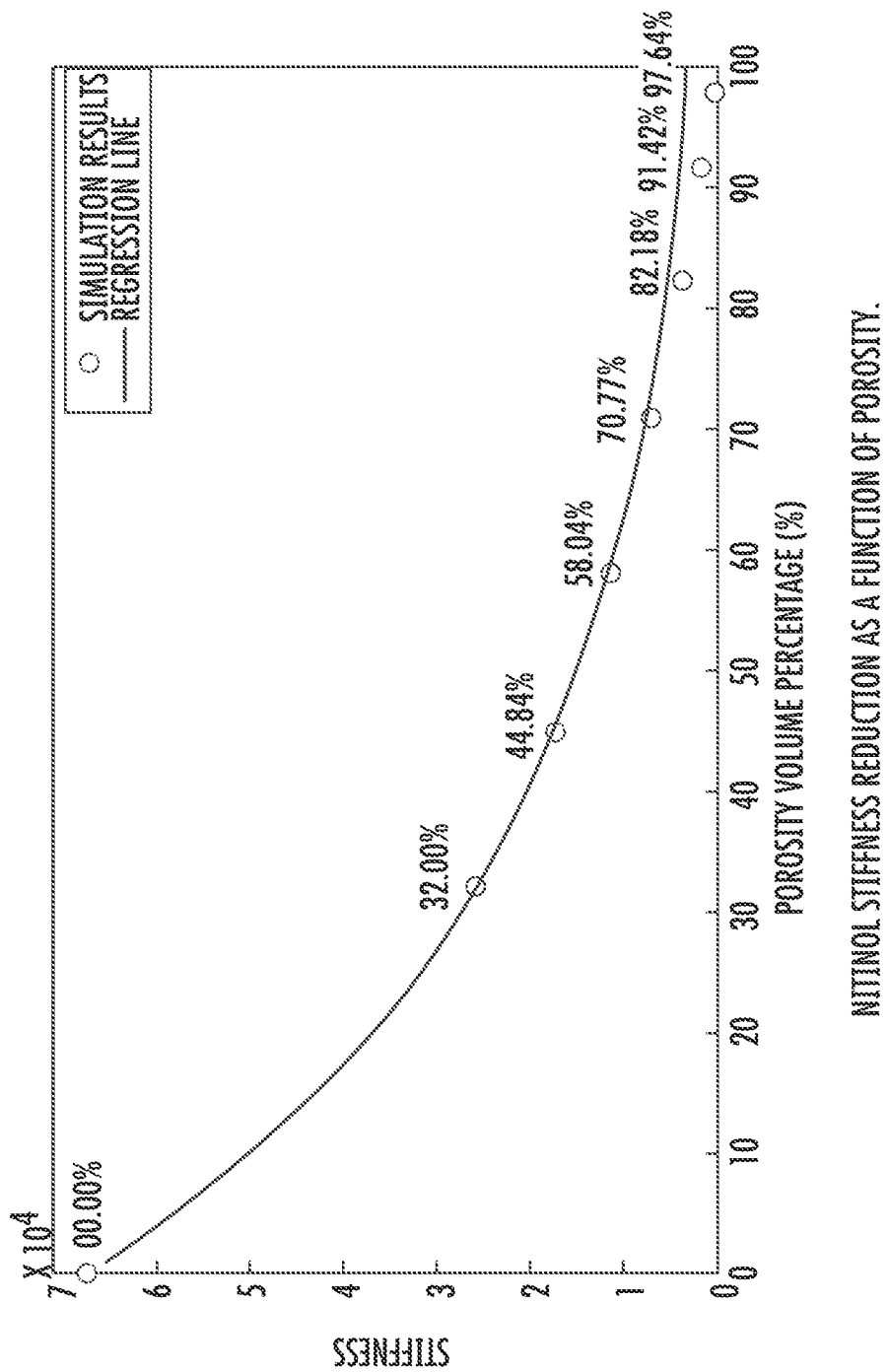
FIG. 5 shows nitinol stiffness reduction as a function of porosity, exemplifying optimization of material and mechanical properties, biocompatibility, and formability.

Porous nitinol, with stiffness ranging from above to below that of cortical bone, has been demonstrated to be rendered by 3D printing. For reference, FIG. 5 shows nitinol stiffness reduction as a function of porosity. Therefore, on site manufacturing allows for substantially matching stiffness to the exact need of any location in the mandible (as shown in FIG. 4) through 3D printing. The local stiffness requirements in different portions of the pelvis can be determined from a CT-scan.

To encourage the stimulatory effect on bone remodeling and long-term maintenance by recreating normal loading patterns will be the starting point of our design process. Factors such as the stability and degree of micro-motion between the implant and the bone, cross-sectional area porosity, and type of bone (trabecular or cortical) have also been found to affect implant integration. These properties can be significantly enhanced by composition- and process-optimization of the implant's alloy and geometry and the use of 3D printed porosity to produce anatomical site-matched stiffness profiles.

In accordance with principles described herein, an actual design process for an implant in a point-of-care manufacturing system will proceed along the following steps:

1. For the given patient anatomy perform FE with a set of representatives loading and boundary conditions to obtain the required effective response of the implant.
2. Identify an optimal arrangement of the local (spatial varying) properties of the implant such that the response of the implant most closely matches that of the patient pelvis over the chosen set of loading conditions. This will be accomplished via a modified topological optimization routine and/or material optimization. Material optimization alters the spatial distribution of material properties/local structure to reach an optimal effective implant performance objective given constraints of patient geometry, loading, fixation requirements, and bulk material properties.
3. Developing a mapping that relates the local material structure (i.e., local distribution of pores) to the desired local properties via finite element analysis
4. Use the identified mapping to assign local structures to the implant
5. Manufacture the implant with the desired spatial varying structure via subtractive machining.

Over the past 3 decades topology optimization (TO) has become a relatively mature research field and the developed algorithms are widely available in commercial software packages. TO is now widely accepted as a powerful approach to develop innovative and efficient conceptual designs and has been adapted to a wide variety of disciplines including solid mechanics, fluid dynamics, thermal transport, etc. Perhaps the most well-known application is the minimum compliance problem where the local geometry of a part is optimized to that it is as stiff as possible (minimum compliance) for a given weight or equivalently minimize weight for a given target stiffness. The most well-known algorithm is the Solid Isotropic Material with Penalization (SIMP) where the local material density was allowed to continuously vary (guaranteeing a smooth convex optimization), but a penalty was applied for intermediate densities to three the optimization toward solutions where all the points were either fully solid or a pore.

According to principles described herein, we are seeking an optimal spatial varying property field over a structure with a fixed geometry. Consider the problem of stiffness matching a pelvic retainer, we wish to vary the elastic stiffness (parameterized by Youngs Modulus E) so that the effective elastic response matches that of the existing bone under the set of prescribed loading conditions. Using the standard notation common for structural mechanics and FEA the compliance of a structure is defined as $$\mathbb{C} = F^T U$$

Where F is a vector of nodal forces and U is a vector containing the nodal displacements. If we denote the target compliance for the $i^{th}$ loading condition as $$\mathbb{C}_0^{(i)},$$

the optimization can then be more formally written as:

Find $E=[E_1, E_2, \ldots, E_N]$

Figure 6:
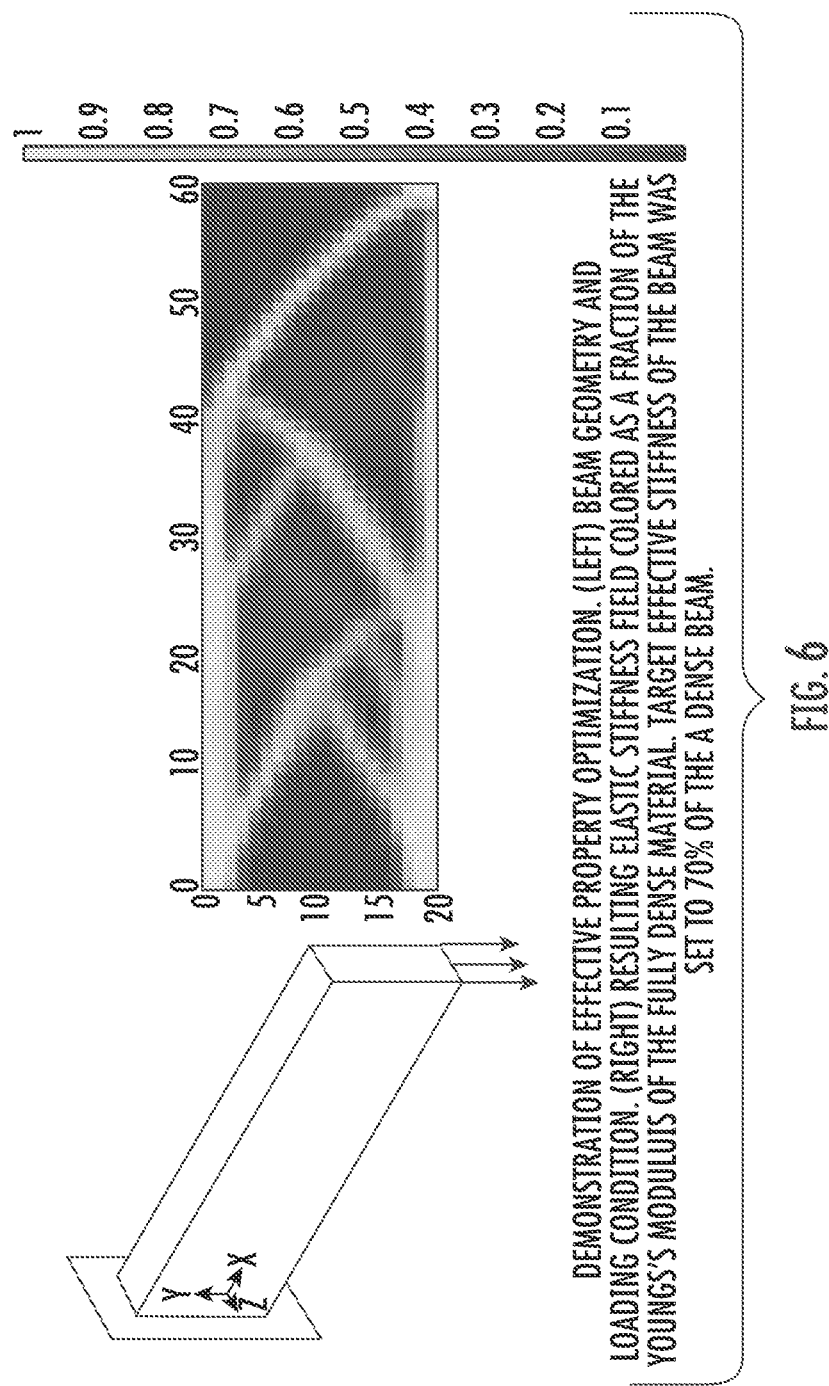
FIG. 6 shows a demonstration of effective property optimization (left) and beam geometry loading condition (right).

Minimize $\Sigma_i |\mathbb{C}^{(i)} - \mathbb{C}_0^{(i)}|$ where summation is over all loading conditions Subject to $0 \leq E_n \leq E_0$ for all spatial positions $n=[1, \ldots, N]$ The above optimization is convex and can be rapidly solved with a modified SIMP TO code. A simple example is shown in FIG. 6 where compliance of a cantilever beam was matched to 2× a dense beam. FIG. 6 shows a demonstration of effective property optimization (left) and beam geometry loading condition (right). Resulting elastic stiffness field colored/shaded as a fraction of the young's modulus of the fully dense material. Target effective stiffness of the beam was set to 70% of the dense beam.

Figure 7:
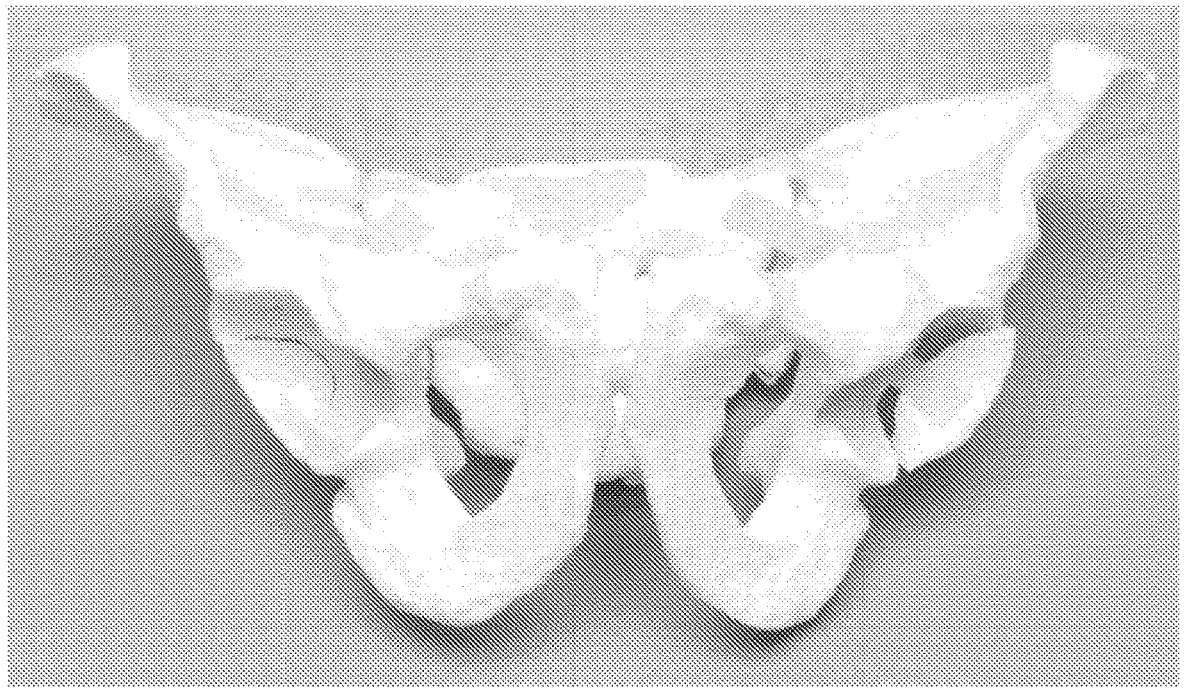
FIG. 7 shows an example plastic pelvis model.

Validation of the present example of pelvic trauma may be perforated in plastic models, such as the plastic pelvis model made by Sawbones, Inc. FIG. 7 shows an example plastic pelvis model from Sawbones. The models (FIG. 7) are commonly used by resident doctors to practice state of the art plate bending and placement and fracture repair and can be used in an in vitro demonstration of implant deployment and mechanical testing. The model may be 3D CT-scanned and converted to a digital anatomical model for functional simulation in our biomechanical simulation environment developed. The biomechanics associated with normal pelvic loading can be used to determine the functional requirements of the fixation plate needed to restore, conceptually, the function of the plastic pelvic model following traumatic pelvic ring fracture.

Metrics for comparison of current best practices and the proposed approach to implant fabrication and deployment may include geometric fit and mechanical performance. Geometric fit can be qualitatively assessed by the physicians when they fit the fabricated fixation plates to the plastic pelvic model.

Mechanical performance can be measured by loading the fixation plates in a mechanical testing device, such as a device from an Instron, with loading conditions relevant to the biomechanical loading that would be present in vivo. Numerical comparisons between the stress-strain patterns in the implants and simulated model can be made to assess the match between the fixation plate's performance.

Commercial, of-the-shelf fixation plates that can be manually bent to fit the plastic pelvic model may be used. In the present conceptual example, the fixation plates may either be stainless steel or Ti-6Al-4V, as a demonstration.

While the present demonstration relates to geometric fit, functional requirements of the implant may also be evaluated and tailored to a patient's pelvis according to principles described herein.

Different manufacturing approaches including additive and subtractive construction may be used. In the case of additive, the geometry of the fixation plate may be directly printed and include mesa-scale porosity heterogeneously throughout the plate to locally tailor stiffness. In the present demonstration example, plates may be printed using a Concept Laser (GE Additive, Cincinnati, OH) M250 powder bed fusion metal 3D printer. In the case of subtractive manufacturing of non-AM blanks, a standard dense, but undrilled (no screw holes) fixation plate materials from a commercial source may be locally machine mesa-scale porosity via abrasive waterjetting or micro-CNC at CDME. Once functional porosity has been added to parallel the additive approach for local stiffness control, the plate will be formed to shape.

As contemplated herein, the local fabrication according to principles described herein may include traditional, 3D Printing, autonomous manufacturing—e.g., local robotic device with as few as possible stations and as many changeable working devices as possible.

In another aspect, soft dies may be formed, likely out of aluminum, to form the machine plate against which blanks will be bent using hydroforming. In some instances, "a pre-tailored blank" that approximates the dimensional requirements of a typical patient based on patient subgroup averages or data or the like. For example, blanks can be deformed or milled that are close to the correct shape, in biomedical application are biocompatible, and close to the form and mechanical properties that can be optimized to achieve most patient's functional needs and/or joined to other parts (e.g., hip step to joint). Multi-material may contribute in controlling function that restores normal stress-strain trajectories of a now dysfunctional joint (e.g., hip knee spine, shoulder, etc.). In another aspect, this will be done by iterative metal forming using robotics. Metamorphic manufacturing which emphasizes that both the component shape and microstructure are transformed by the process may also be used in all systems and methods described herein. Metamorphic methods use incremental forming and numerically positioned or controlled tools (for example, a robot locating a workpiece between the punches of a hydraulic press and repeatedly deforming a programmed amount, moving the workpiece and repeating).

According to principles described herein, deformation and machining can be performed near medical operating rooms to match a patients anatomy. For example, scans of the patient such as an MRI, CT, Ultrasound, PET, SPECT, etc. radiographic imaging—non-destructive etc., can be performed on the patient and the result provided by direct communication or other means of data transfer between the device and a computer running modeling software in the same facility to perform FE analysis with a set of loading and boundary conditions specific to the patient to obtain the required effective response of the implant/prothesis, etc. This is part of collecting information that will inform (1) function of personalized part, (2) optimal fabrication to achieve that part—choice of blank, fabrication process, checking along the way and auto-calibrating (i.e., machine learning) to achieve the desired shape and function of the part. Examples of applications of the principles described herein include total joint replacement (e.g., hip, knee, spine, shoulder, jaw), skeletal graft or fracture fixation, heart valve, cranial implant, orofacial prosthetic, auditory implant, osteointegrating device (e.g., percutaneous), etc.

The system may then identify an optimal arrangement of the local (spatial varying) properties of the implant such that the response of the implant/prothesis, etc. most closely matches that of the patient's anatomy over the chosen set of loading conditions. This may be accomplished via a modified topological optimization routine. The system then may be used to develop a mapping that relates the local material structure (i.e., local distribution of pores) to the desired local properties, for example, via finite element analysis. The identified mapping may then be used to assign local structures to the implant and the implant/prothesis manufactured with the desired spatial varying structure via subtractive machining or additive manufacture.

While described herein using 3D printing (additive) and blank forming, subtractive techniques, other on-site manufacturing systems can be used. For example, Subtractive, Additive, Deformation (shaping, bending), Joining or welding subcomponents, Coating and surface treatments, etc. Most approved FDA systems are centralized productions, such as in known supply chain and factory production that produces identical parts without regard to functional, individualized need, such as for medical implants fit to a patient's anatomy or mechanical replacement parts fit to equipment wear and/or damage patterns. Outcomes, including longevity of the replacement operations, are expected to improve with the use of a replacement part according to principles described herein.

Referring again to FIG. 1, in a detailed example of the present systems and methods, imaging/scanning is performed on a patient at the point of care, e.g., a hospital, surgical center or the like. The results of patient imaging/scanning is provided to a system, such as a computer running appropriate software, for surface isolation and template matching. A digital anatomical model is thus generated for virtual surgical planning with function requirements for the desired patient outcome to create a digital anatomical model with restored function and provided to a system for designing the implant and generating manufacturing process instructions for the localized manufacturing of the implant/prothesis using any of a variety of techniques, including, but not limited to 3D printing, blank forming, Subtractive, Additive, Deformation (shaping, bending), Joining or welding subcomponents, Coating and surface treatments, etc. The localized manufacturing equipment thus makes the implant tailored to the patient needs, which is then provided to the patient via appropriate surgical/medical procedures.

Thus, the present systems and methods start with digital topological that can be developed from one of several scanning methods that may be proximate to the patient or not. For example, fixing a skeletal issue may include immediately acquired data or data that has been recorded or a long time period, including pre-surgical or pre-intervention time period(s). Computations are then performed to design the appropriate part for improved performance and improved manufacturing path.

The term "optimal" is used herein to connote an improvement, such that resulting performance may be improved over other known processes. The "optimization" can include estimates of stiffness and development of a nominal manufacturing path.

The component manufacture is at or near the point of care of intervention. This may start with a nominally shaped component based on average anatomy. This may start as feedstock that is manufactured in one of several ways:

Subtractive, Additive, Deformation (shaping, bending), Joining or welding subcomponents, Coating and surface treatments. A nominally shaped component may be adjusted by automated bending/shaping to a specific patient's needs. Improved conformation to the patient should improve reliability and performance significantly. Optical or other dimensional scanning will often determine if the component is within manufacturing tolerance. If not, it will be re-shaped, cut or bent to reach tolerance. The use of automated bending and shaping is novel in this area and special. It will allow the rapid adjustment of nominally-shaped components to a patient's anatomy.

Systems of multiple tools for making these parts, where all the tool actions are automated, may be used to manufacture the component. Dimensional precision can be accomplished by fixing the component and having the tools for addition, removal, deformation, inspection, and coating moving to the past, or the part could be in a standard fixture and moved precisely from one type of operation to the other.

Deformation can also be used to change local material properties (usually deformation makes the material locally harder and can introduce residual stresses that can help or hurt—but can be used to improve processes to include locally beneficial residual stresses).

In all kinds of bone breaks or interventions, a stainless steel or titanium plate that looks like a popsicle stick with holes to hold bones together is often used. These blanks are often shaped and cut by the surgeon in the OR to a patient's needs. This does not give optimal results. One application according to principles described herein is an automated bending system that will take the nominal shape and bend it to a patient's needs. This will give improved performance, and optical scanning may be used to test final shape and guide reshaping.

A single system may perform the surface isolation and template match, generate the anatomical model and virtual surgical planning, creating the digital anatomical model with restored function, designing the implant and generating the manufacturing process instructions, and instructing the local manufacturing equipment or these steps may be performed on/by different systems, where data between the systems may be directly communicated from system to system or provided via other means, including via network or internet/intranet connectivity.

In accordance with principles described herein, a 3D printed surgical guide that fit the patient unambiguously in the OR or intra-operative image-based (stereotactic) guidance to place the implant safely may be provided. An interface similar to the systems provided herein may facilitate postoperative outcome assessment.

An example method of manufacturing a custom part, includes, for example, scanning a location for said custom part to generate a map of the location including custom topology of the location; matching the custom topology to a template for a type of part to be customized to generate a digital model of said custom part; generating manufacturing processing instructions according to the template and the custom topology for a localized manufacturing device; providing the manufacturing processing instructions to the localized manufacturing device; manufacturing the custom part using the localized manufacturing device.

The scanning can identify wear and/or damage patterns in the location for the implant/repair.

The scanning can be scanning a body part of a patient. The custom part can be a medical implant. The digital model can be a digital anatomical model.

In another aspect, the custom part can be a mechanical replacement part.

The matching can include surface isolation and template matching.

The manufacturing process instructions are generated based on a digital model including restorative functional specifications.

The localized manufacturing device can take on a variety of forms and multiple pieces of equipment or tools may be used in an automated way. Equipment used may include a 3D printer using any of the existing methods, numerically-controlled machining, commonly referred to as Computer Numerically Controlled (CNC) machining and automated deformation, which through bending or forging can change the shape of the component, without adding or removing materials. These processes can all be automated and standard fixtures may either allow the tools to move to a fixed part location or move the part to fixed tools, or some combination of these methods.

The manufacturing can be performed by any of a number of methods including additive method, subtractive methods, deformation, joining and coating methods, (additive manufacturing), CNC machining (milling—subtractive manufacturing) and deformation systems such as robotic (including multiple arm—collaborating robots) or non-robotic bending, hammering, forging, rolling, milling, bending, press-molding and so on. Process engineering may include avoiding residual stress or panning to remove.

The scanning is performed in proximity to the manufacturing device.

A system for manufacturing a custom part includes a scanning device for scanning a location for said custom part to generate a map of the location including custom topology of the location; a localized manufacturing device, and a computer processor running thereon software capable of executing instructions to generate manufacturing processing instructions according to the template and the custom topology for a localized manufacturing device; and provide the manufacturing processing instructions to the localized manufacturing device for manufacturing the custom part according to the manufacturing process instructions.

The scanning device can be any type of medical scanning device appropriate for providing the datapoints for a finite element analysis to be performed, such as an MRI, CT scanner, Ultrasound, PET, SPECT, etc., radiographic imaging—non-destructive.

The manufacturing device can be any appropriate localized manufacturing equipment including, but not limited to, separately and in combination, but not limited to, a 3D printer (additive manufacturing), CNC machining (milling—subtractive manufacturing) and deformation systems such as robotic (including multiple arm—collaborating robots) or non-robotic bending, hammering, forging, rolling, milling, bending, press-molding and so on. Process engineering may include avoiding residual stress or panning to remove.

The custom part can be a medical implant or other mechanical repair or replacement part.

The digital model may be a digital anatomical model.

The matching may be surface isolation and template matching.

The manufacturing process instructions may be generated based on a digital model including restorative functional specifications.

The methods herein may start de novo from a template, which is then brought into design creation, such that the process provides mechanical and fabrication process dual optimization.

The novel system described herein therefore aims to produce a digital twin "design" that is optimized for Geometry of outcome part, Mechanical properties of outcome part, and Process of production (i.e., optimal use of hybrid autonomous devices and other devices for best cost-benefit and obtaining function of outcome device).

Advantages of the systems and methods described herein include reduced delays owing to centralized production; reduced time to design/build central factory; reduced supply chain disruption delays due to forwarding manufacturing capabilities (lessons of Covid-19 pandemic). Medical fields where centralized production is disadvantageous are cancer, trauma, indeed, emergent health emergencies (cardiac, trauma, etc.), such that systems and methods according to principles described herein provide improved patient care. Bringing local physicians, engineers, and the patient into the process is likely to enhance personalization and success of part to be produced.

POCM implementation according to principles described herein provides ability to have short run, personalized fabrication with dual optimization of fabrication process and function of device that is output—with overall goals of cost-benefit and improved function, even though, in some cases off-the-shelf may continue to prevail.

According to principles described herein, traditional, 3D printing and/or any try of autonomous or semi-autonomous manufacturing—local robotic device with as few as possible stations and as many changeable working devices as possible may be used to manufacture the subject part/device, which is the opposite of assembly line committed to taming out same part every time. For example, metamorphic manufacturing or hybrid autonomous manufacturing of non-medical or non-medical parts/devices is contemplated for all embodiments and processes described herein.

As used herein, personalized may also be referred to as patient-matched (FDA), custom (lay public), patient-specific, etc. Any implant described herein may be a medical or surgical implant.

The disclosures of the following publications in their entireties are hereby incorporated by reference into this application in order to more fully describe the state of the art to which this invention pertains.

Dean D, Min K-J, Bond A: Computer aided design of large-format prefabricated cranial plates. J. Craniofacial Surgery, 14:819-832, 2003.

Subramanyan K, Dean D: Production of Average 3D Anatomical Surfaces. Medical linage Analysis 4:317-334, 2000.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments, but should be defined only in accordance with the following claims and their equivalents.

What is claimed is:

1. A method of manufacturing a custom and/or personalized part, comprising:
   providing a template for a custom part;
   matching a custom topology of a location for placement of the custom part to the template to generate a digital model of said custom part;
   generating manufacturing processing instructions for a blank according to the template and the custom topology for a localized manufacturing device, wherein the manufacturing processing instructions comprise instructions to repeatedly and incrementally deform and position the blank using a hydraulic press by the localized manufacturing device;
   providing the manufacturing processing instructions to the localized manufacturing device;
   manufacturing the custom part from the blank according to the manufacturing processing instructions using the localized manufacturing device.

2. The method of claim 1, further comprising generating a map of the location.

3. The method of claim 2, wherein the scanning comprises scanning an area of a patient in need of surgical or external device intervention.

4. The method of claim 3, wherein the custom part is a medical or surgical implant.

5. The method of claim 1, wherein the digital model is a digital anatomical model.

6. The method of claim 1, wherein the custom part is a mechanical replacement part.

7. The method of claim 1, wherein the scanning identifies wear and/or damage patterns in the location.

8. The method of claim 1, wherein said matching comprises surface isolation and template matching.

9. The method of claim 1, wherein said manufacturing process instructions are generated based on a digital model including restorative functional specifications.

10. The method of claim 1, wherein the localized manufacturing device is 3D printer, CNC machining and deformation systems including robotic or non-robotic bending, hammering, forging, rolling, milling, bending, and press-molding.

11. The method of claim 1, wherein the manufacturing is performed by Subtractive, Additive, Deformation (shaping, bending), Joining or welding subcomponents, and Coating and surface treatments.

12. The method of claim 1, wherein the scanning is performed in proximity to the manufacturing device.

13. The method of claim 1, including a numerically controlled deformation process or at least one of a digital blacksmithing, metamorphic manufacturing, hybrid autonomous manufacturing and/or autonomous manufacturing.

14. The method of claim 1, wherein the blank approximates the dimensional requirement of the custom part.

15. The method of claim 14, wherein the pre-tailored blank that approximates the dimensional requirements of a typical patient based on patient subgroup averages.

16. A system for manufacturing a custom part, comprising:
   a localized manufacturing device, and
   a computer processor having a non-transitory computer-readable medium comprising instructions which, when executed cause execution of instructions to:
   provide a template for a custom part;
   match a custom topology of a location for placement of the custom part to the template to generate a digital model of said custom part;
   generate manufacturing processing instructions for a blank according to a template for a custom part and a custom topology for a localized manufacturing device, wherein the manufacturing processing instructions comprise instructions to repeatedly and incrementally deform and position the blank using a hydraulic press by the localized manufacturing device;

provide the manufacturing processing instructions to the localized manufacturing device for manufacturing the custom part according to the manufacturing process instructions; and manufacturing the custom part from the blank according to the manufacturing processing instructions using the localized manufacturing device.

17. The system of claim 16, further comprising a scanning device for scanning a location for said custom part.

18. The system of claim 17, wherein the scanning device is an MRI, CT scanner, Ultrasound, PET, or SPECT, or radiographic imaging.

19. The system of claim 16, wherein the manufacturing device includes a 3D printer, CNC machining and deformation systems including robotic or non-robotic bending, hammering, forging, rolling, milling, bending, and press-molding.

20. The system of claim 16, wherein the custom part is a medical or surgical implant.

21. The system of claim 17, further comprising generating a digital model according to the scanning.

22. The system of claim 21, wherein the digital model is a digital anatomical model.

23. The system of claim 16, wherein the custom part is a mechanical replacement part.

24. The system of claim 17, wherein the scanning identifies wear and/or damage patterns in the location.

25. The system of claim 16, further comprising matching a custom topology of a location for placement of the custom part to the template to generate a digital model of said custom part.

26. The system of claim 25, wherein said matching comprises surface isolation and template matching.

27. The system of claim 16, wherein said manufacturing process instructions are generated based on a digital model including restorative functional specifications.

28. The system of claim 16, the non-transitory computer-readable medium further comprising instructions which, when executed cause execution of instructions to perform a numerically controlled deformation process or at least one of a digital blacksmithing, metamorphic manufacturing, hybrid autonomous manufacturing and/or autonomous manufacturing.

29. The method of claim 16, wherein the blank approximates the dimensional requirement of the custom part.

30. The method of claim 29, wherein the pre-tailored blank that approximates the dimensional requirements of a typical patient based on patient subgroup averages.

* * * * *